United States Patent [19]

Maeding et al.

[11] 4,275,315
[45] Jun. 23, 1981

[54] CHARGE SUMMING FILTER APERTURE CORRECTOR

[75] Inventors: Dale Maeding, San Juan Capistrano; Michael Y. Pines, Los Angeles, both of Calif.

[73] Assignee: Hughes Aircraft Company, Culver City, Calif.

[21] Appl. No.: 83,424

[22] Filed: Oct. 10, 1979

[51] Int. Cl.³ .................. G11C 19/28; H01L 29/78; H01L 27/14; H01L 31/00
[52] U.S. Cl. .................. 307/221 D; 307/311; 357/24; 357/30
[58] Field of Search ............... 357/24, 30; 307/221 D, 307/311

[56] References Cited

U.S. PATENT DOCUMENTS

| 3,883,437 | 5/1975 | Nummedal et al. | 357/24 |
| 4,139,784 | 2/1979 | Sauer | 357/24 |

Primary Examiner—Gene M. Munson
Attorney, Agent, or Firm—Robert M. Wallace; William H. MacAllister

[57] ABSTRACT

An optically scanned monolithic focal plane array includes an on-chip aperture corrector interposed between the photodetector output register and the multiplexer, thereby providing data to the aperture corrector in an order parallel to the direction of optical scan, advantageously eliminating any requirement of additional hardware for demultiplexing, memory or timing functions. The desired transfer function is achieved by providing a supplementary source of charge flow in addition to the photodetector signal, the supplementary charge flow being reduced in response to each signal charge packet at first and second intervals which are advanced and delayed respectively with reference to each corresponding signal charge packet by a selected interval. This reduction is proportional to a portion p of the signal charge packet which is determined by adjustment of bias voltages controlling injection of supplementary charge without requiring a charge splitting mechanism. The resulting transfer function boosts the high frequency response of the system, thereby providing aperture correction to compensate for high frequency attenuation.

15 Claims, 16 Drawing Figures

CHARGE SUMMING FILTER APERTURE CORRECTOR

TECHNICAL FIELD

This invention is related to charge coupled device imager systems including optically scanned monolithic focal plan arrays of optical detectors in which aperture correction is required to compensate for optical and detector frequency response roll-off, and specifically monolithic focal plan arrays having a multiplexed output requiring aperture correction.

RELATED APPLICATION

This application is related to U.S. Patent application Ser. No. 83,423, filed Oct. 10, 1979 by Michael Y. Pines and I. David Levy and entitled "Monolithic Focal Plane Array Having On-Chip Aperture Corrector," and assigned to the assignee of this Application.

BACKGROUND ART

Charge coupled device imagers presently include monolithic focal plane arrays of photodetectors in which the entire imaging device is provided on a single semiconductive substrate or "chip". It is well-known that the frequency response of such imaging devices has attenuation ("roll-off") at higher frequencies due to the response characteristics of the photodetectors and associated electronic hardware. Therefore, an electronic filter or "aperture corrector" is provided to process the output signal from the monolithic focal plane array chip to provide "aperture correction", or compensation for this roll-off. For this purpose, additional electronics are provided external to the chip to boost the high frequency response, providing the requisite aperture correction.

A significant problem arises when the output signal data is multiplexed so as to be reorganized in a direction perpendicular to the direction of optical scan of the imager system. In order to perform aperture correction in multiplexed imager systems, additional hardware must be provided to perform demultiplexing, timing and memory functions, increasing the size, cost and complexity of such systems.

SUMMARY OF THE INVENTION

The foregoing problems are eliminated in the present invention, a monolithic focal plane array having an aperture corrector provided directly on the monolithic focal plane array chip between the optical detectors and the multiplexer. The aperture corrector is a charge coupled device operated at a selected clock frequency and is of unique simplicity and compactness to facilitate its integration directly on the monolithic focal plane chip so that aperture correction may be performed before the data is multiplexed, thereby eliminating any requirement for additional hardware to provide the functions of demultiplexing, timing and memory. As a result, the size, cost and complexity of charge coupled device imagers are significantly reduced in the present invention.

In an aperture corrector not claimed in this application, the serial output of charge packets from a column of photodetector is precisely divided or "split" into a main channel and a parallel secondary channel. Each charge packet is sensed in the secondary channel at two offset locations to create two offset signals which are advanced and delayed respectively by two clock periods with respect to the corresponding charge packets in the main channel. Each of the two offset signals cause subtraction or reduction of charge transfer in the main at intervals which are advanced and delayed respectively by two clock periods from the corresponding charge packet in the main channel, thereby providing a transfer function having the requisite roll-off compensation. In the preferred mode of this species, supplementary charge packets created in a diode diffusion are constantly transferred into the main channel and combined with the original charge packets. The bias voltage of the diode diffusion controlling the size of the supplementary charge packets is reduced according to the two offset signals from the secondary channel.

In another embodiment of this invention, charge flow is reduced in the main channel by the imposition of a potential barrier, the barrier being controlled by the two offset signals from the secondary channel.

Performance is greatly improved in the present invention by eliminating the necessity of charge splitting in the main channel and, instead, providing a feed forward charge summing filter in which charge packets from a main channel and a parallel secondary channel are summed at a node where the two channels converge. In one embodiment of the present invention, supplementary charge flow is constantly generated in the secondary channel. Simultaneously, the photodetector output signal enters the main channel and is sensed at two offset intervals to cause two reductions in the supplementary charge flow in the secondary channel. The reduced supplementary charge packets arrive at the summing node in the main channel at intervals advanced and delayed respectively by four clock periods with respect to the time of arrival of each sensed signal charge packet at the summing node.

In the preferred embodiment of this invention, a transfer function is achieved to provide aperture correction which compensates for frequency response roll-off, the transfer function of the first species of this invention having a peak response at a frequency slightly below one-half the charge coupled device clock frequency. Fabrication of the monolithic focal plane array and aperture corrector is greatly facilitated because the aperture corrector may be formed on the same chip with the monolithic focal plane array during many of the same processing steps.

BRIEF DESCRIPTION OF THE DRAWINGS

The invention is best understood by reference to the accompanying drawings, of which.

DETAILED DESCRIPTION OF THE INVENTION

Figure 1:
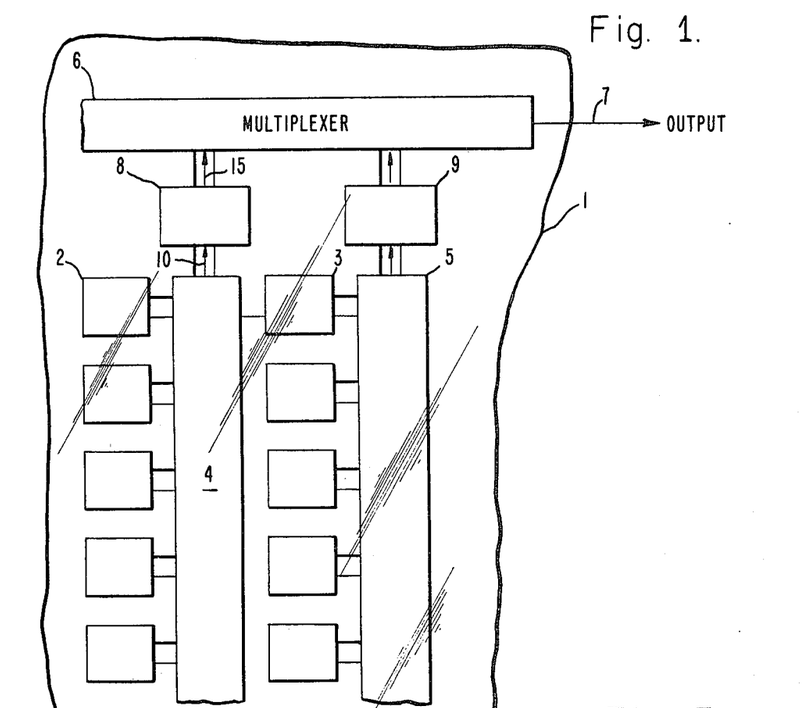
FIG. 1 is a plan view of a portion of a semiconductive substrate on which is formed a monolithic focal plane array including the on-chip aperture corrector of this invention.

FIG. 1 is a plan view of a portion of a semiconductive chip 1 on which is formed a monolithic focal plane array (MFPA) charge coupled device (CCD). The MFPA includes a first plurality of photodetectors 2 arranged in a first column and a second plurality of photodetectors 3 arrange in a second column and CCD serial registers 4 and 5 disposed adjacent and parallel to the first and second columns respectively and arranged to receive charge packets in parallel from the pluralities of detectors 2 and 3, respectively. Data is read serially from the registers 4 and 5 into parallel inputs of a multiplexer 6 and is then unloaded at an output 7. Monolithic focal plane arrays are well known in the art, as exemplified in U.S. Pat. No. 3,883,437 filed by Nummedal, et al and assigned to the assignee of this application. Generally, an optical device, not shown, scans as external field of view, causing incident light to scan down the columns of photodetectors 2 and 3, creating charge packets in the photodectors 2 and 3 which are read into the serial registers 4 and 5, respectively, and then read into the multiplexer 6. Because the optical device causes the incident light to scan down the columns of photodetectors 2 and 3 in a direction parallel to the columns, it is apparent that the charge packets or data in the CCD serial registers 4 and 5 are arranged in an order parallel to the direction of optical scan. However, the multiplexer 6 rearranges the data in an order perpendicular to the direction of optical scan, after which the data is read at the output 7.

One problem with MFPAs is that the optical device, the photodetectors 2 and 3 and other electronic devices incorporated in the MFPA, but not shown in FIG. 1, have a frequency response characterized by attenuation or roll-off at higher frequencies in the vicinity of one-half the CCD clock frequency. Therefore, it is necessary to provide hardware which performs "aperture correction" or compensation for this high frequency roll-off. Such hardware must process the output data from the MFPA in parallel with the direction of optical scan in order to achieve compensation for the high frequency roll-off. It has already been seen that the data from the MFPA output 7 is available only in an order perpendicular to the direction of optical scan. Therefore, aperture correction may be achieved only by first demultiplexing the data form the MFPA output 7. A prior art processor useful for performing aperture correction must therefore include not only hardware for performing roll-off compensation, but must also include additional hardware for performing demultiplexing, timing, and memory functions, requiring a substantial increase in complexity and size, a significant disadvantage.

In this invention, the foregoing problems are solved by providing on-chip aperture correctors 8 and 9 of sufficiently compact size to fit directly on the MPFA chip 1 between the multiplexer 6 and the serial registers 4 and 5, respectively. The aperture correctors 8 and 9 function to boost the high frequency content of the serial charge packet data output from the registers 4 and 5, respectively, thereby compensating for high frequency roll-off. It has already been seen that the data in the registers 4 and 5 is serially arranged in an order parallel to the direction of optical scan so that the aperture correctors 8 and 9 receive this data in the correct order, thus eliminating any requirement for additional hardware to perform the functions of demultiplexing, timing and memory. Because the aperture correctors 8 and 9 are charge coupled devices, they may be formed on the MFPA chip 1 simultaneously with the fabrication of the other elements on the chip 1, thus reducing the number of required fabrication steps.

Figure 2:
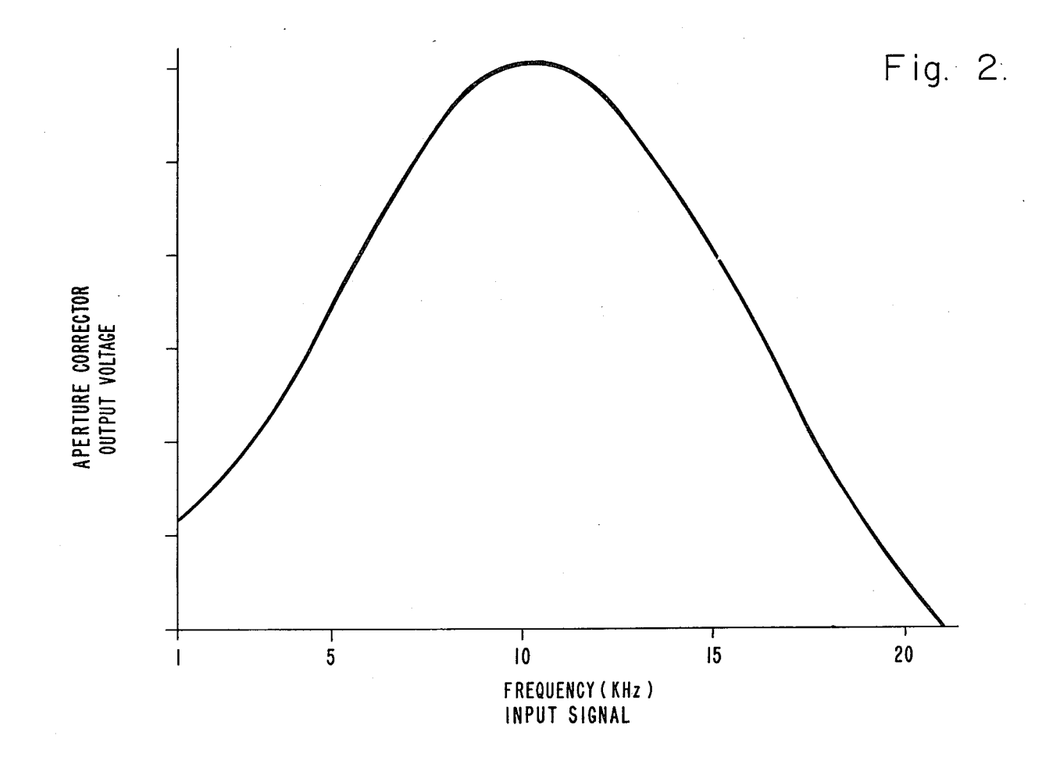
FIG. 2 illustrates the desired transfer function of the aperture corrector of FIG. 1.
Figure 3:
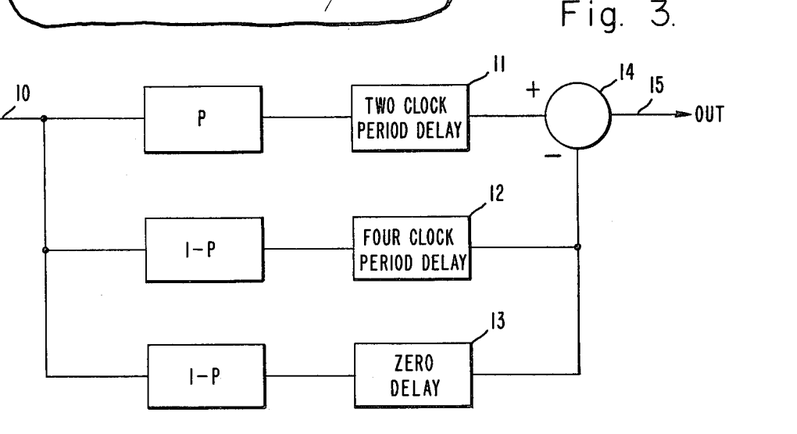
FIG. 3 is a functional block diagram of the aperture corrector of FIG. 1 corresponding to the transfer function of FIG. 2.

FIG. 2 illustrates the desired transfer function of each of the aperture correctors 8 and 9, clearly showing a boost in the frequency response at about one-half the 26 khz clock frequency. The transfer function of FIG. 2 is implemented in the process illustrated in the functional block diagram of FIG. 3, showing the individual operation of one aperture corrector 8 or 9 of FIG. 1. The serial register 4 receives charge packets from the column of photodetectors 2 and transfers them serially to the aperture corrector 8 in which they are processed and sent to the multiplexer 6. The register 4 and the aperture corrector 8 may both be two-phase charge coupled devices which operate to transfer charge at a clocking frequency ($\sim$26 khz), which shall be designated $F_c$, so that charge packets in the register 4 are transferred into the aperture corrector 8 once every two clock periods, where each clock period is equal to $1/F_c$. (Charge transfer in charge coupled devices is a well-known process to those skilled in the art and is exemplified in numerous patents, including U.S. Pat. No. 3,913,077 filed by Darrell M. Erb, and assigned to assignee of this application.)

The block diagram of FIG. 3 shows that each charge packet transferred to input 10 of the aperture corrector 8 is split into two fractional charge packets containing fractional amounts, P and $1-P$, of the original input packet, where P is a number less than unity. In the preferred embodiment, P is 75%, while $1-P$ is 25%. A two clock period delay 11 receives the larger fraction of charge, P. The smaller fraction of charge, $11-P$, is fed to a four clock period delay 12 and to a zero delay 13. A summing-subtracting node 14 subtracts the output of the four clock period delay 12 and of the zero delay 13 from from the two clock period delay 11, and feeds the result to output 15 of the aperture corrector 8.

Figure 4A:
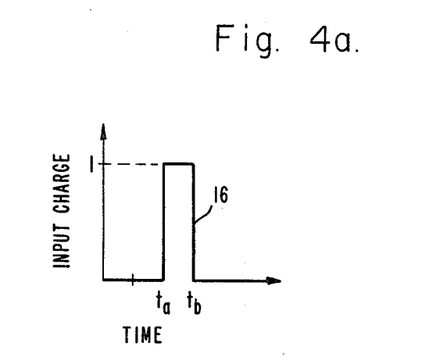
FIG. 4a illustrates a single signal impulse applied to the aperture corrector of FIG. 1.
Figure 4B:
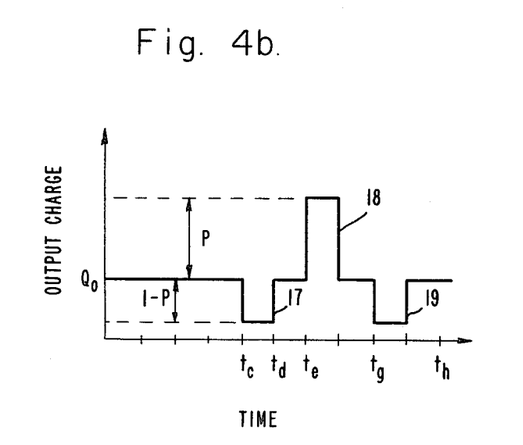
FIG. 4b illustrates the response to the impulse of FIG. 4a of the aperture corrector of FIG. 1 in accordance with the functional block diagram of FIG. 3.

FIG. 4 illustrates the impulse response corresponding to the process illustrated in FIG. 3. A single input charge packet 16, illustrated in FIG. 4a as an impulse signal, appears at the input 10 to the aperture corrector 8 during an initial clock period from time $t_a$ to time $t_b$. A fractional amount, $1-P$, of the input charge packet 16 passes through zero delay 13 and is subtracted at the node 14 to appear as a reduction 17 in the output signal illustrated in FIG. 4b during a first output clock period from time $t_c$ to time $t_d$. A fractional amount P of the input charge packet 16 passes through the two clock period delay 11 and is added at the node 14 to appear at the output 15 as an increase 18 in the output signal illustrated in FIG. 4b, during a second output clock period from time $t_e$ to time $t_f$. Finally, a fractional amount 1−P of the input charge packet 16 passes through the four clock period delay 12 and is subtracted at the node 14 to appear at the output 15 as a reduction 19 in the output signal illustrated in FIG. 4b, during a third output clock period from time $t_g$ to time $t_h$. It should be noted that if the impulse signal charge packet 16 of FIG. 4a were mathematically convolved with the time domain transform of the transfer function illustrated in FIG. 2, the result substantially would be the response illustrated in FIG. 4b. Furthermore, the frequency domain transfer function illustrated in FIG. 2 may be mathematically derived from the functional block diagram of FIG. 3 using Z transform theory, as is well known to those skilled in the art. The magnitude of the transfer function thus derived is easily shown to be given by the following expression:

$$[P - 2(1-P) \cos(2\pi F/F_c)] [\sin(2\pi F/F_c)]/(2\pi F/F_c).$$

The particular transfer function illustrated in FIG. 2 may be obtained from the foregoing expression by substituting 0.75 for P and 26 Khz for $F_c$. The factor, $[\sin(2\pi F/F_c)]/(2\pi F/F_c)$ appearing in the above expression is a result of periodic sampling by the CCD system, which occurs at the CCD clock frequency $F_c$.

Figures 5, 7:
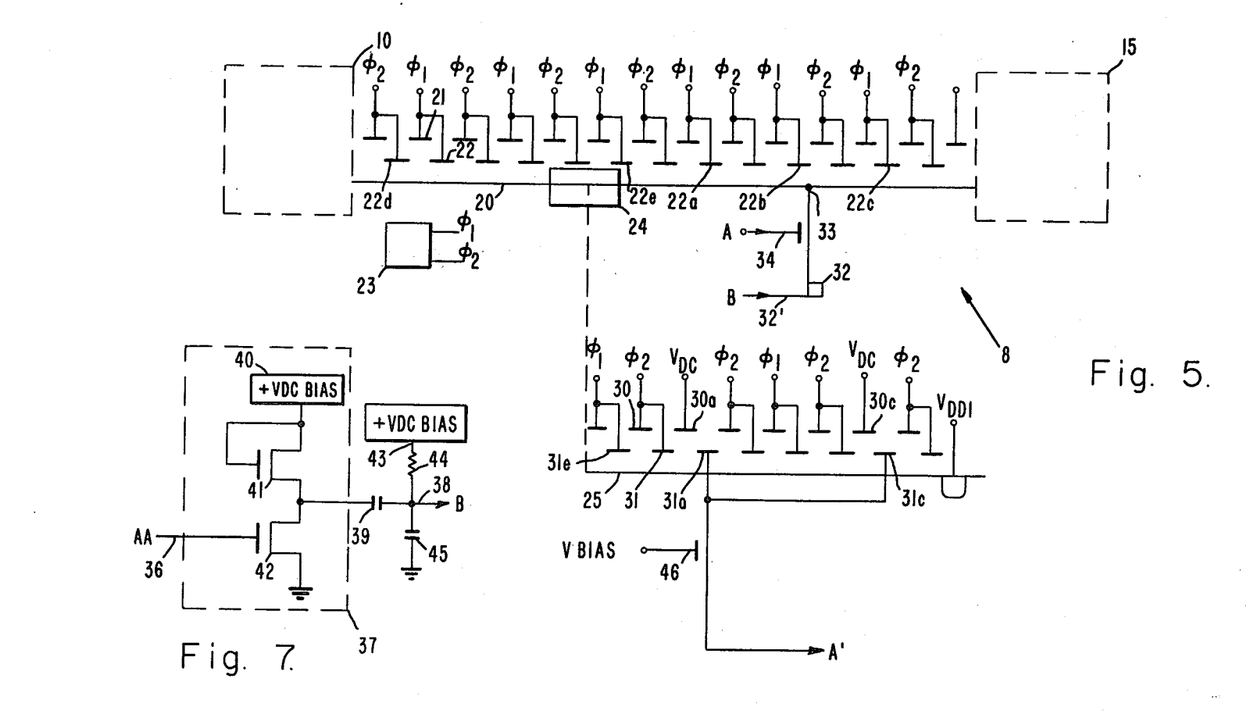
FIG. 5 is a schematic diagram of one aperture corrector not claimed in this application which utilizes a charge splitting mechanism.
FIG. 7 is a schematic diagram of a coupling circuit utilized in the preferred embodiment of the device of FIG. 5.

FIG. 5 is a schematic diagram of an on-chip CCD aperture corrector disclosed and claimed in the above referenced Pines and Levy application in which a charge splitting method is used. The charge splitting aperture corrector of FIG. 5 includes a CCD serial register 20 extending from the input 10 to the output 15 of the aperture corrector 8. The register 20 includes a plurality of upper and lower level electrodes 21 and 22, respectively, connected together in paris. A clock pulse generator 23 feeds clock signals $\phi_1$ and $\phi_2$, illustrated in FIG. 11, to alternate pairs of electrodes 21 and 22 to provide a two-phase CCD structure in the register 20. Charge packets from the serial output of the storage register 4 are transferred through the input 10 of the aperture corrector into the serial register 20 and split into two smaller charge packets in a charge splitting mechanism 24, illustrated in the plan view of FIG. 6, which allows 75% of the input charge packet to continue flowing in the serial register 20, while the remaining 25% of the input charge packet is fed into a secondary channel 25. The charge splitting mechanism 24 includes a first channel stop 26 having a pointed tip 27 facing incoming charge and a second channel stop 28 having a pointed tip 29 also facing incoming charge flow. Charge splitting is a technique well known in the art, and is disclosed by Sequin et al, *Charge Transfer Devices*, Academic Press (1975), page 61.

The secondary channel 25 is a CCD serial register of the same structure as the serial register 20, including a plurality of upper and lower electrodes 30 and 31 connected together in pairs and disposed adjacent corresponding ones of the main channel electrodes 21 and 22, alternate pairs receiving different ones of the clock signals $\phi_1$ and $\phi_2$ to provide a two-phase CCD structure parallel to the main channel 20. Each charge packet from the input 10 entering the splitting mechanism 24 is divided into two charge packets flowing in the main, and these two charge packets are transferred in the main channel 20 and the secondary channel 25 in parallel with one another so that when the main charge packet is beneath either one of the main channel electrodes 22a or 22c, the second charge packet is beneath the corresponding one of the adjacent secondary channel electrodes 31a and 31c. The secondary channel electrodes 31a, 31c are floating CCD electrodes of the type well-known in the art which assumes an electrical potential proportional to the polarity and amount of charge stored thereunder. The adjacent upper level electrodes 30a, 30c, are connected to a negative voltage source, VDC, to provide an attractive potential well beneath the floating electrodes 31a, 31c.

Charge flow in the main channel 20 is supplemented by charge supplied by a diode diffusion 32 which is forward biased at a connecting conductor 32'. The supplementary charge from the diode diffusion 32 enters the main channel 20 at an entrance 33 underlying lower level electrode 22b. A charge packet is held during alternate clock periods beneath the electrode 22b and is augmented by a nominal amount $Q_o$ of supplementary charge from the diode diffusion 32.

Preferably, the MFPA 1 includes a substrate of n-type conductivity, while the upper and lower electrodes 21, 22, 30 and 31 are formed of upper and lower layers of polysilicon, respectively. The clock generator 23 generates two offset negative clock signals $\phi_1$ and $\phi_2$, illustrated in FIGS. 11a and 11b respectively, which provide p-channel two-phase CCD operation. The diode diffusion 32 is therefore of p-type conductivity and is forward biased at the conductor 32' with a positive voltage. Furthermore, the channel stops 26 and 28 of the charge splitting mechanism 24 are regions of highly concentrated n-type impurities.

The desired transfer function is obtained by reducing the supplementary charge below the nominal level $Q_o$ during two intervals which are advance and delayed respectively by two clock periods with respect to the time of arrival of each main charge packet beneath the electrode 22b.

Referring to FIG. 4b, a main charge packet 18 is superimposed on a nominal supplementary charge level $Q_o$, and the supplementary charge is reduced below $Q_o$ at two intervals 17 and 19 which are advanced and delayed respectively with reference to the main charge packet 18.

In the most simple embodiment of the aperture corrector of FIG. 5, the secondary channel electrodes 31a and 31c are connected directly to a gate 34 adjacent the diode diffusion 32 controlling charge flow into the entrance 33 adjacent main channel electrode 22b. Resistance to supplementary charge flow beneath the gate 34 is directly proportional to the amount of charge sensed under the secondary channel electrodes 31a and 31c. The main channel electrodes 22a, b and c are disposed at intervals of four electrodes as shown in FIG. 5 in order to achieve the desired two clock period intervals of advance and delay. Whenever a main charge packet underlies either one of main channel electrodes 22a or 22c, the corresponding split-off secondary charge packet will simultaneously underlie the corresponding secondary channel electrodes 31a and 31c respectively, and the amount of supplementary charge flowing from the diode diffusion 32 to the entrance 33 adjacent main channel electrode 22b will be reduced accordingly.

The preferred embodiment of the species of FIG. 5 will now be described in which a circuit illustrated in FIG. 7 couples the floating electrodes 31a, 31c of the secondary channel 25 to the diffusion 32 of the primary channel 20 so that, instead of being connected to the gate 34 directly, they are coupled to the diffusion 32 through the circuit of FIG. 7. The input 36 controls an inverter 37 supplying a negative voltage to an output 38 through a capacitor 39. The inverter includes a negative voltage source 40, a first p-channel MOSFET 41 and a second p-channel MOSFET 42 having its gate connected to the input 36. The coupling circuit of FIG. 7 also includes a DC bias voltage source 43 connected to the output 38 through resistor 44. The output 38 is also connected to ground through capacitor 45 and is connected to the diode diffusion 32 to supply a controlled forward bias voltage. Preferably, the capacitor 39 has a capacitance of 8,200 pico-farads, the capacitor 45 has a capacitance of 0.68 micro-farads and the resistor 44 has a resistance of 698 k-ohms. An additional electrode 46 may be interposed between the floating electrodes 31a, 31b and the input 36 to the coupling circuit to provide an additional means of adjusting the response of the aperture corrector of FIG. 5. Additional adjustment of the response may be obtained by changing the potential on the gate 34 adjacent the diode diffusion 32. The operation of this coupling circuit is as follows: When positive charge is held in the potential well beneath either of the electrodes 31a or 31c, the potential of the electrode 31a or 31c increases so that the resistance of the MOSFET 42 increases, thereby increasing the amount of negative voltage coupled from negative voltage source 40 through the capacitor 39 to the output 38, to partially offset the positive voltage applied from the positive voltage source 43. As result, the positive bias voltage at the diode diffusion 32 is reduced, causing a corresponding reduction in the supplementary charge $Q_o$ injected at the entrance 33 from diode diffusion 32.

Figure 11A:
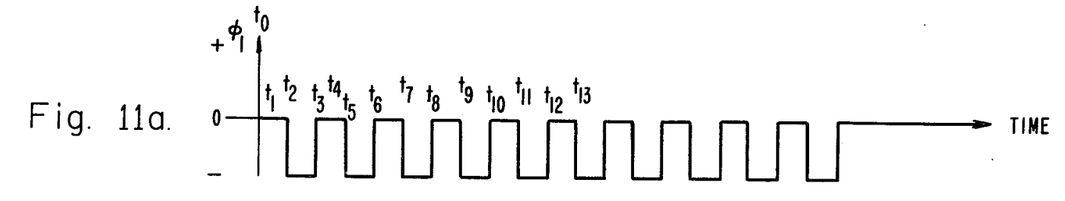
FIG. 11 illustrates the time domain waveforms of various clock signals applied to the aperture correctors of FIGS. 5 and 9.
Figures 11B, 11C, 11D:
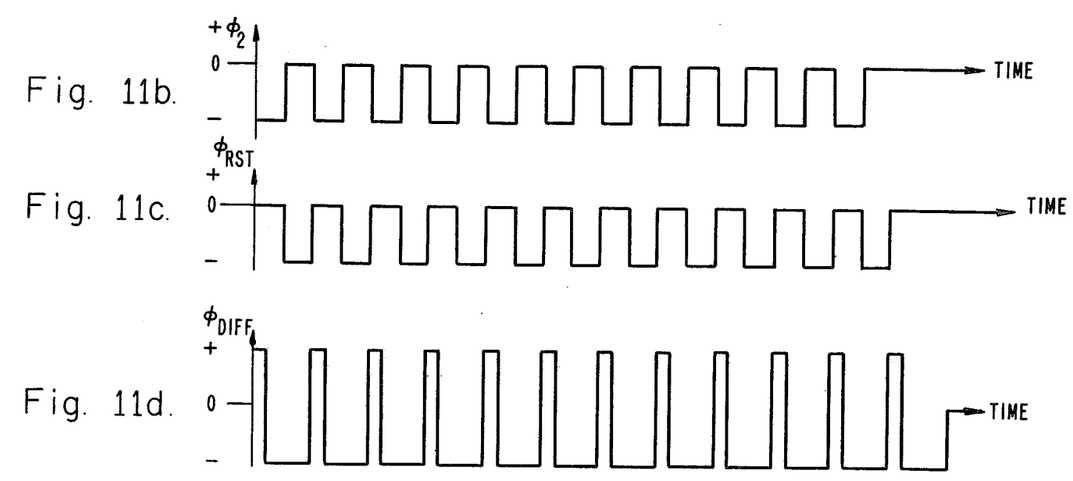

The processing of a single signal charge packet entering through the input 10 in the foregoing preferred embodiment of the species of FIG. 5 will now be described by reference to the timing diagrams of FIGS. 11a and 11b. At time $t_o$, the clock signal $d_2$ is negative, and a signal charge packet enters through the input 10 and is stored beneath the main channel electrode 22d. Supplementary charge packets are injected through the entrance 33 to be held beneath main channel electrode 22b each time $d_1$ is negative, namely at times $t_2$, $t_5$, and $t_7$, to establish a nominal level of supplementary charge flow $Q_o$ in the main channel 20. At time $t_7$, when the clock signal $d_1$ is negative, the signal charge packet is transferred through the charge splitting mechanism 24, so that a secondary potion, 1−P, of the packet resides in the secondary channel 25 beneath secondary channel electrode 31e, while the main portion P is stored beneath main channel electrode 22e, where the proportioning factor P is precisely determined by the alignment of the channel stops 26 and 28 in the charge splitting mechanism 24 of FIG. 6. At time $t_9$, the split-off secondary charge packet is transferred beneath the secondary channel electrode 31a, increasing the potential of the electrode 31a to create a positive voltage at the input 36 to the coupling circuit of FIG. 7, causing a reduction in the supplementary charge injected at the entrance 33 below the nominal level $Q_o$, in the manner previously described.

At time $t_{10}$, the secondary charge packet is transferred out from under the floating electrode 31a so that no positive voltage is applied to the input 36 of the coupling circuit. Thus, the diode 32 injects the nominal level of supplementary charge $Q_o$ through the entrance 33 during the next clock period at time $t_{11}$, when the corresponding signal charge packet in the main channel 20 is held beneath the electrode 22b adjacent the entrance 33. Two clock periods later at time $t_{13}$, the secondary charge packet resides under the floating electrode 31c, and the supplementary charge flow at the entrance 33 is again reduced in the same manner while the corresponding signal charge packet is stored beneath the main channel electrode 22c. The resulting arrangement of charge packets corresponds to the output signal illustrated in FIG. 4b.

Figure 8:
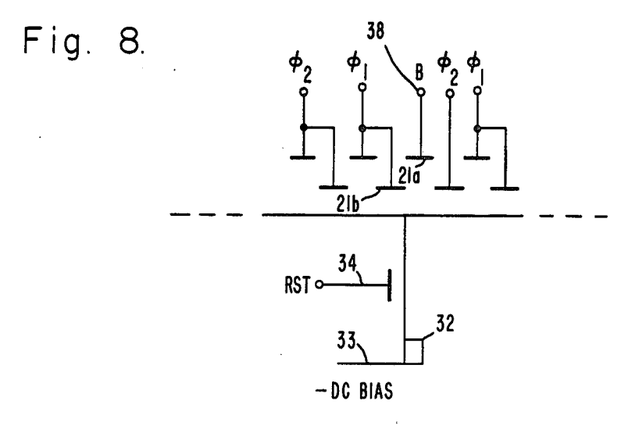
FIG. 8 is a schematic diagram illustrating a modification obtained in an alternative embodiment of the device of FIG. 5.

In another alternative embodiment of the aperture corrector of FIG. 5, the output 38 of the coupling circuit 37 is not connected to the diode diffusion 32, but as indicated in FIG. 8, is connected instead to electrode 21a in the main channel 20. The electrode 34 adjacent the source diode 32 is connected to receive a third clock signal $\phi$rst illustrated in FIG. 11c, which provides a charge removal function to be described below. In this alternative embodiment, positive charge sensed beneath either of the electrodes 31a or 31c in the secondary channel 25 causes the surface potential under the electrode 21a to increase, creating a potential barrier beneath the electrode 21a to block charge transfer in the main channel 20. This feature has the same effect of reducing charge flow in the main channel 20 as described above, except that, instead of reducting supplementary charge flow, the signal charge flow is reduced. The diode diffusion 32 is reverse biased so that excess charge, which may be built up at the potential barrier underlying electrode 21a, is periodically removed or swept out of the main channel under the control of the electrode 34 to prevent a excessive charge build-up. Thus it is seen that a transfer function is provided by splitting charge into two portions P, 1−P, which is determined by the precise alignment of the channel stops 26, 28 of the charge splitter 24 of FIG. 6.

Figure 6:
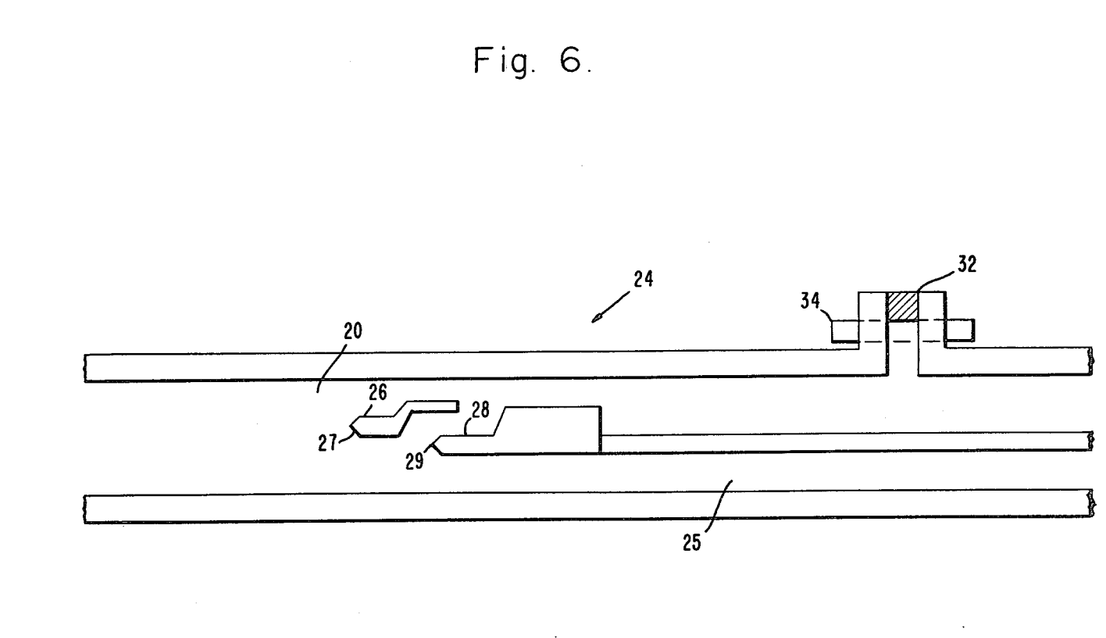
FIG. 6 is a simplified plan view of the device shown in FIG. 5.
Figure 9:
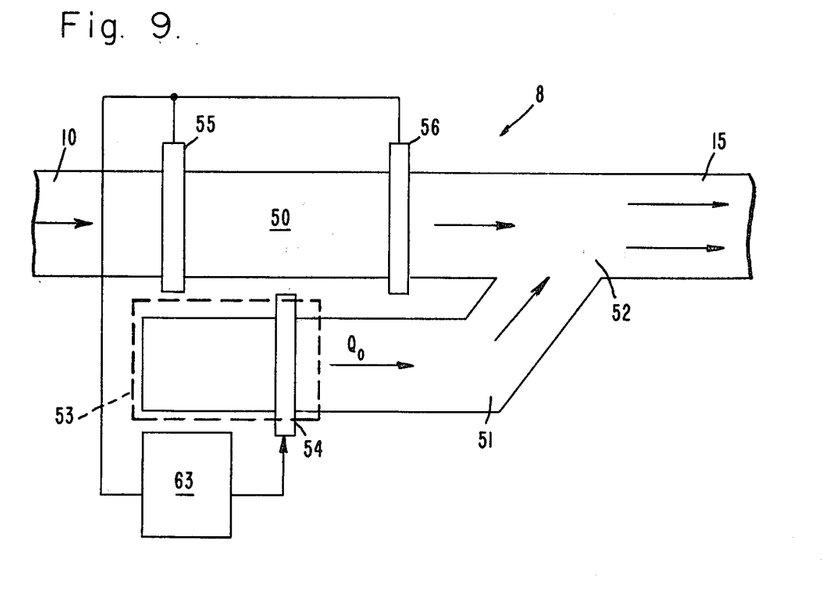
FIG. 9 is a simplified plan view of the present invention, a charge summing filter aperture corrector.

FIG. 9 is a simplified plan view of the present invention claimed in this application in which the desired transfer function illustrated in FIG. 2 is obtained by summing charge in the main channel, eliminating the necessity of the charge splitting mechanism 24 of FIG. 5. One advantage of the charge summing filter of FIG. 9 over the charge splitting device of FIGS. 5 and 6 is that the channel splits of FIG. 6 are no longer required. Masking tolerances, which must be relatively stringent in order that the channel splits 26 and 28 divide the incoming charge into the precise proportions of 75% and 25%, are significantly relaxed in the charge summing filter of FIG. 9.

The charge summing filter of FIG. 9 includes a main channel 50 having an input 10 and an output 15 corresponding to the plan view of FIG. 1. A secondary channel 51 merges with the main channel 50 at a summing node 52. The channels 50 and 51 are two-phase CCD serial registers, and signal charge packets are serially fed from the output of register 4 through the input 10 to the main channel 50, while supplementary charge packets flow into the secondary channel 51 from a charge injector 53 and are summed into the main channel at the summing node 52. Each supplementary charge packet from the charge injector 53 is transferred through the secondary channel 51 under the control of secondary channel control electrode 54, and flows in parallel with charge in the main channel 50. Two sensing electrodes 55 and 56 are displaced in the main channel 50 with respect to the adjacent location of the secondary channel control electrode 54 at intervals which are advanced and delayed, respectively, by four clock periods. The amount of supplementary charge passing under the secondary channel control electrode 54 is reduced by signal charge sensed beneath the main channel sensing electrodes 55 and 56 by virtue of their connection to the secondary channel control electrode 54 through a source follower 63. The charge summing filter of FIG. 9 is preferably a p-channel device so that, as positive signal charge packets are sensed beneath either of the main channel sensing electrodes 55 and 56, the positive potential on the control electrode 54 is increased, thereby increasing the resistance to positive supplementary charge flow beneath the control electrode 54, causing a corresponding reduction below a nominal level $Q_o$ of supplementary charge flow. Because the sensing electrodes 55 and 56 are displaced with respect to the control electrode by four clock periods, it is apparent that a first reduction in supplementary charge flow occurs at the summing node 52 four clock periods in advance of the arrival of the signal change packet sensed by electrode 55 at the node 52, while a second reduction in supplementary charge flow occurs at the summing node 52 four clock periods after the arrival of the signal charge packet 18 at advanced and delayed intervals corresponding to the negative pulses 17 and 19, respectively. As a result, the charge summing filter of FIG. 9 has an impulse response similar to that illustrated in FIG. 4, corresponding to the frequency domain transfer function similar to that illustrated in FIG. 2.

Figure 10:
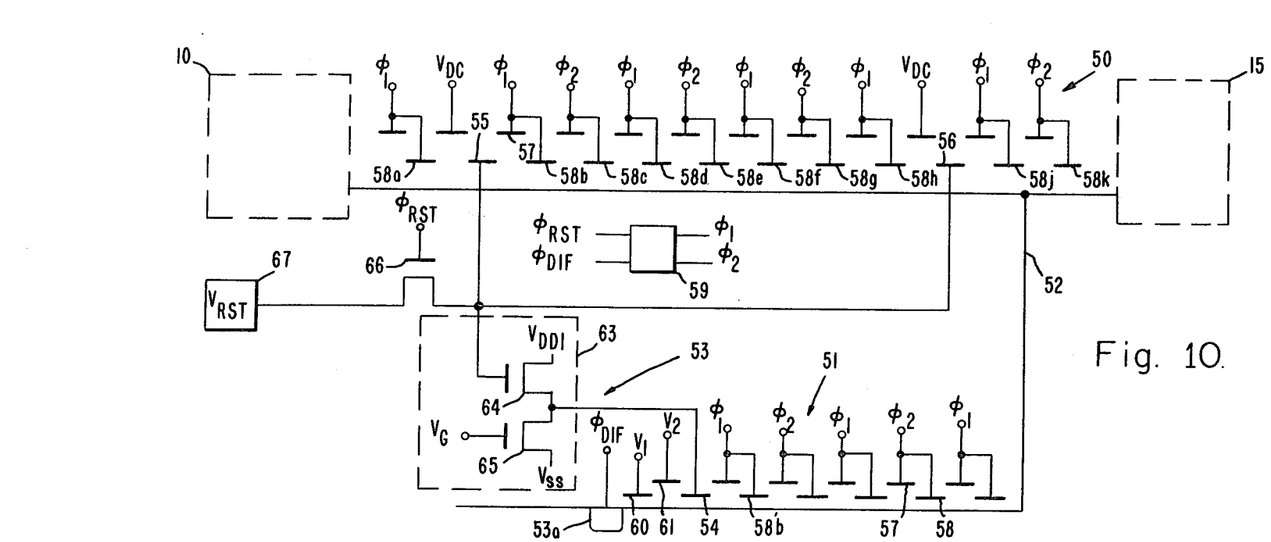
FIG. 10 is a schematic diagram of the charge summing filter of FIG. 9.

FIG. 10 illustrates the preferred embodiment of the charge summing filter of FIG. 9. The main channel 50 is formed on an n-type substrate having an overlying plurality of upper and lower level of polysilicon electrodes 57, 58, respectively, connected together in adjacent pairs, alternate pairs being connected to receive the negative clock signals $\phi_1$, $\phi_2$ from a clock generator 59. The parallel secondary channel 51 similarly includes a plurality of upper and lower electrodes 57' and 58' respectively overlying the n-type substrate and connected in the same manner to the clock generator 59. Charge flow in each of the channels 50 and 51 is from left to right. The input 53 to the secondary channel 51 is preferably a fill and spill input having an input diode diffusion 53a, input gates 60 and 61 connected to constant voltage sources $V_1$, $V_2$ and a fill and spill control electrode 54, and operates to inject supplementary charge into the secondary channel 51 at a nominal level $Q_o$. The fill and spill input 53 is well known, and is discussed, for example, in Sequin et al, *Charge Transfer Devices*, Academic Press, (1975), pages 48–49.

The sensing electrodes 55 and 56 are floating electrodes of the type well known in the art, which assume an electrical potential proportional to the polarity and amount of charge stored thereunder. They are disposed to the main channel at intervals which are advance and delayed respectively by displacements corresponding to four clock periods with respect to the location of the fill and spill electrode 54, and are connected to the fill and spill electrode 54 through the source follower 63. The source follower 63 includes a p-channel MOSFET 64 having its gate connected to the floating electrodes 55 and 56 and connected to another p-channel MOSFET 65 having its gate connected to a preselected gate voltage $V_g$, the drain of the MOSFET 64 being connected to a drain voltage $V_{dd}$ and the source of MOSFET 65 being connected to a source voltage $V_{ss}$. The main channel floating electrodes 55 and 56 are gated through a reset switch 66 to a negative voltage source 67, and the reset switch 66 receives a periodic clock pulse signal $\phi_{rst}$ generated by the clock pulse generator 59. Charge injection from the diode 53a is controlled by a periodic clock pulse signal $\phi_{dif}$ generated by clock pulse generator 59 in the manner well known in the art.

The desired reductions in supplementary charge below the nominal level $Q_o$ at the intervals discussed above are achieved as follows: The reset switch 66 causes the gate of MOSFET 64 and the sensing electrodes 55, 56 to be set to the negative voltage $V_{rst}$ of reset voltage source 67, causing the MOSFET 64 to apply a negative voltage $V_{dd}$ to the control electrode 54, allowing a nominal level $Q_o$ of supplementary charge to be transferred beneath the control electrode 54. However, positive signal charge packets transferred beneath the main channel sensing electrodes 55, 56 decrease the amount of negative voltage applied to the gate of the MOSFET 64 in proportion to the amount of charge sensed thereunder, which decreases the conductivity of the MOSFET 64, thereby proportionately reducing the negative voltage applied to the control electrode 54, reducing the amount of supplementary charge injected into the secondary channel 51 below the nominal level $Q_o$ in proportion to the amount of charge sensed by the electrodes 55, 56. The proportion factor P, discussed above in connection with FIG. 5, may be determined by selecting the voltage $V_2$ to be applied to the charge injection electrode 61. Although the voltage $V_2$ may drift, this disadvantage should not be as significant as the advantage of eliminating the charge splitter 24. Because the sensing electrodes 55, 56 are each displaced with respect to the control electrode 54 by four clock periods, each signal charge packet causes two such reductions in supplementary charge to be summed at the node 52 four clock periods before and four clock periods after the signal charge packet arrives at the node 52, respectively.

Figure 12:
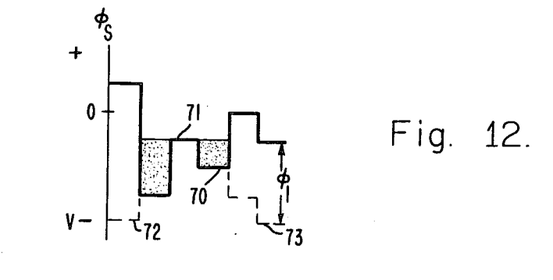
FIG. 12 is a diagram of the electrical surface potential corresponding to the charge input structure of the charge summing filter of FIG. 10.

The processing of a signal charge packet entering the charge summing filter of FIG. 10 at the input 10 will now be described with simultaneous reference to FIGS. 10, 11 and 12. FIG. 11 illustrates the time domain waveforms of the clock signals discussed above while FIG. 12 illustrates the substrate surface potential in the Tompsett input 53.

At time $t_o$, of FIG. 11, the clock signal $\phi_{dif}$ is positive, causing the diode diffusion 53a to inject supplementary charge into the Tompsett input structure 53. A potential well 70 in the surface potential $\phi_2$ illustrated in FIG. 12 is formed beneath the control electrode 54 by the application of a negative voltage $V_{dd}$ through the MOSFET 64 to the control electrode 54, and the injected charge fills the well 54. At time $t_1$, the clock signal $\phi_{dif}$ is negative, creating an attractive potential 72 in the diode diffusion 3a, which causes excess charge above potential barrier 71 to be drained from the well 70 back into the diode diffusion 3a. The remaining charge is proportional to the depth of the well 70, which is determined by the negative voltage applied to the control electrode 54. As discussed above, if no signal charge packets are held beneath the main channel sense electrodes 55, 56, the remaining charge in the well 70 corresponds to the nominal level $Q_o$ of supplementary charge. At time $t_2$, $\phi_1$ is negative and creates a potential well 73 beneath the secondary channel electrode 58'b into which the remaining charge spills from the well 70. Simultaneously at time $t_2$ the negative clock signal $\phi_1$ creates an attractive potential well beneath main channel electrodes 58a, into which a signal charge packet from input 10 may be transferred.

Also at time $t_2$, the reset gate 66 is turned on by the clock signal $\phi_{rst}$, causing a reset voltage from the source 67 to be applied to each of the sensing electrodes 55 and 56 and to the gate of MOSFET 64, resetting the potential of each of them to $V_{rst}$. Subsequently, at time $t_3$, the negative potential is removed from electrode 58a when the clock signal $\phi_1$ returns to 0 volts, and the signal charge packet is transferred from beneath the main channel electrode 58a to be held beneath the main channel sensing electrode 55. Simultaneously, the reset gate 66 is opened when the clock signal $\phi_{rst}$ returns to zero at time $t_3$, allowing the potential of the sensing electrodes 55, 56 to float. The positive signal charge packet underlying the floating electrode 55 causes the conductivity of the p-channel MOSFET 64 to decrease, thereby reducing the amount of negative voltage applied to the control electrode 54 and reducing the depth of the well 70. Meanwhile at time $t_3$, the clock signal $\phi_{dif}$ is negative, causing removal of excess charge in the manner previously described. The remaining charge packet in the potential well 70 is of reduced size, and at time $t_5$ it is spilled into to the secondary channel 51 when the clock signal $\phi_1$ is again pulsed negatively.

The signal charge packet in the main channel 50 and the corresponding supplementary charge packet of reduced size in the secondary channel 51 are transferred from left to right in the schematic diagram of FIG. 10. If no additional signal charge packets enter the input 10, transfer of charge packets in the two channels 50 and 51 continues in the same manner while no charge is sensed beneath the main channel sensing electrodes 55 and 56 so that the Tompsett input 53 continues to operate in the manner previously described to inject supplementary charge into the secondary channel 51 at a constant level $Q_o$ when $\phi_1$ is pulsed negatively at times $t_7$, $t_9$ and $t_{11}$.

At time $t_9$, the supplementary charge packet of reduced size converges into the main channel 50 at the summing node 52 beneath the electrode 58j while the corresponding signal charge packet is stored beneath main channel electrode 58f, so that these two charge packets are separated by four electrode pairs in the main channel 50.

The signal charge packet in the main channel 50 is transferred under the sense floating electrode 56 at time $t_{12}$ and again causes a reduction in the amount of charge injected from the input 53 into the secondary channel 51 in the same manner as previously described. As a result, a second supplementary charge packet of reduced size is created in the secondary channel 51 which arrives at the summing node 52 delayed by four clock periods with respect to the arrival time of the corresponding signal charge packet. As discussed previously, the four clock period interval corresponds to the displacement of the main channel floating electrode 56 with respect to the secondary channel control electrode 54. The resulting serial arrangement of charge packets in the main channel 50 is similar to the output signal illustrated in FIG. 4b.

Although the charge input source 53 in the preferred embodiment is a Tompsett input, any charge injection means may be used which modulates the amount of charge injected into the secondary channel in response to signal charge packets sensed in the main channel 50 by the floating sensing electrodes 55, 56. Furthermore, while the means for sensing charge in the main channel has been described as the resettable floating sense electrodes 55, 56, any suitable charge sensing means may be used, such as a floating diffusion.

Thus, the charge summing filter aperture corrector of FIG. 10 supplements charge flow in the main channel 50 by supplementary charge furnished by the secondary channel 51. The desired impulse response similar to that illustrated in FIG. 4 is achieved by reducing the amount of supplementary charge supplied to the main channel in response to each signal charge packet injected at the input 10 to the main channel 50 at two intervals, one of which is advanced the other which is delayed with respect to each corresponding signal charge packet in the main channel 50. In the preferred embodiment of the species of FIG. 10, these intervals are equal to four CCD clock periods, although the interval may be varied according to the transfer function required, so that the interval may be any integral multiple of the CCD clock period, $1/F_c$. Significantly, the foregoing is accomplished in a highly compact CCD structure shown in FIG. 1 to form the miniaturized aperture corrector 8, integrated onto the MFPA chip 1 between the photodetector output registers 2, 4 and the multiplexer 6. As a result, data is available to the aperture corrector in an order parallel to the direction of optical scan, thereby eliminating any requirement for additional demultiplexing timing or memory hardware in the aperture correctors 8, 9.

We claim:

1. In a charge coupled device (CCD) formed on a semiconductive layer transferring charge once every CCD clock period, an optically scanned monolithic focal plane array having a serial output register storing signal charge packets, a multiplexer and an on-chip charge summing aperture corrector, said charge summing aperture corrector comprising:

a main CCD charge flow channel in said semiconductive layer for a serially transferring charge packets from said serial register to said multiplexer in an order parallel to the direction optical scan;

a secondary CCD charge flow channel in said semiconductive layer for serially transferring supplementary charge packets in synchronism with charge flow in said main channel;

a summing node in said main channel intermediate said register and said multiplexer, said secondary channel merging with said main channel at said summing node; and a charge controller comprising:

first electrode means in said main channel for sensing each of said signal charge packets; and, charge injection means responsive to each of said signal charge packets sensed by said first electrode sensing means for effecting a reduction in said supplementary charge packets which arrive at said summing node at a first time, said first time displaced by a first interval from the time of arrival of successive ones of said signal charge packets at said summing node.

2. The device of claim 1 wherein said charge controller further comprises a second electrode in said main channel for sensing each of said signal charge packets, said controller responsive to each of said signal charge packets sensed by said second electrode for effecting a reduction in the supplementary charge packets arriving at said summing node at a second time, said second time displaced by a second interval from the time of arrival of successive ones of said signal charge packets at said summing node.

3. The device of claim 2 wherein said first and second intervals correspond to n of said CCD clock periods.

4. The device of claim 3 wherein said first time and said second time are advanced and delayed respectively with respect to said arrival time by said n clock periods.

5. The device of claim 4 wherein said charge coupled device is a two phase CCD structure and n is equal to 2.

6. The device of claim 1 wherein said charge injection means comprises:
control electrode means overlying said secondary channel for determining the amount of charge to be injected into said secondary channel; and
means connected to said first electrode sensing means in said main channel for establishing the electrical potential of said control electrode means.

7. The device of claim 6 wherein said potential establishing means comprises a source follower having an input and output, said input connected to said sensing electrode in said main channel and said output connected to said control electrode in said secondary channel.

8. The device of claim 6 wherein said main and secondary channels are mutually parallel and said first and second sensing electrodes in said main channel are arranged symmetrically with respect to the location of said charge injection control electrode in said second channel and are displaced with respect thereto by intervals corresponding to an advance and a delay respectively of two of said CCD clock periods.

9. The device of claim 1 further comprising means for resetting the potential of each of said sensing electrodes in said main channel periodically in synchronism with charge transfer in said main channel.

10. The device of claim 9 wherein said charge injector performs charge injection in said secondary channel in synchronism with charge transfer in said main channel.

11. A method of performing roll-off compensation on data generated in an optically scanned focal plane array having a charged coupled device serial register formed in a semiconductive layer storing signal charge packets in an order parallel to the direction of optical scan and a multiplexer, said method using a main charge flow channel formed in said semiconductive layer operating to transfer charge once every clock period and having a summing node intermediate said serial register and said multiplexer, comprising:
transferring signal charge packets from said register to said multiplexer serially in said main charge flow channel in said parallel order;
adding supplementary charge into said main channel at said summing node; and
effecting a temporary reduction of said supplementary charge at said summing node in response to each signal charge packet flowing in said main channel at a first time displaced by a first interval with respect to the time of arrival of successive ones of said signal charge packets at said summing node.

12. The method of claim 11 further comprising reducing said supplementary charge at said summing node in response to successive signal charge packets flowing in said main channel at a second time displaced by a second interval with respect to the arrival time of successive ones of said signal charge packets at said summing node.

13. The method of claim 12 wherein said first and second time intervals correspond to n of said clock periods.

14. The method of claim 13 wherein said first time and said second time are advanced and delayed respectively with respect to said arrival time by said n clock periods.

15. The device of claim 14 wherein said main charge flow channel is a two-phase CCD structure and n equals 2.

* * * * *